(12) United States Patent
Vorndran

(10) Patent No.: US 6,527,668 B2
(45) Date of Patent: Mar. 4, 2003

(54) HYDRAULIC SYSTEM

(75) Inventor: Ralf Vorndran, Eriskirch (DE)

(73) Assignee: ZF Batavia LLC, Batavia, OH (US)

( * ) Notice: Subject to any disclaimer, the term of this patent is extended or adjusted under 35 U.S.C. 154(b) by 0 days.

(21) Appl. No.: 09/900,436

(22) Filed: Jul. 6, 2001

(65) Prior Publication Data

US 2002/0004436 A1 Jan. 10, 2002

(30) Foreign Application Priority Data

Jul. 7, 2000 (DE) .......................................... 100 33 201

(51) Int. Cl.$^7$ .............................................. F16H 57/04
(52) U.S. Cl. .......................................... 477/45; 474/28
(58) Field of Search ....................... 477/45, 46; 474/28, 474/43, 44, 45, 91

(56) References Cited

U.S. PATENT DOCUMENTS

| | | | | |
|---|---|---|---|---|
| 4,735,113 A | * | 4/1988 | Yamamuro et al. ............ | 477/45 |
| 4,850,936 A | * | 7/1989 | Makamura ..................... | 477/46 |
| 4,895,054 A | * | 1/1990 | Rauneker et al. .............. | 477/41 |
| 5,222,418 A | * | 6/1993 | Murota ......................... | 475/159 |
| 5,383,812 A | * | 1/1995 | Tibbles ......................... | 474/28 |
| 5,865,702 A | * | 2/1999 | Yokoyama et al. .......... | 475/117 |
| 6,063,002 A | * | 5/2000 | Nobumoto et al. ............ | 477/41 |

FOREIGN PATENT DOCUMENTS

| | | | |
|---|---|---|---|
| DE | 195 33 976 A1 | 3/1997 | ........... F16H/61/00 |
| EP | 0 634 590 A1 | 1/1995 | ........... F16H/61/00 |

* cited by examiner

*Primary Examiner*—Sherry Estremsky
(74) *Attorney, Agent, or Firm*—Davis & Bujold, P.L.L.C.

(57) ABSTRACT

Proposed is a hydraulic scheme for a stepless automatic transmission of a motor vehicle. The system has a variator which is controlled by a hydraulic regulating apparatus, and which possesses a cooler (11) placed in an oil lubricating/cooling circulation from which a line (14) leads from cooler (11) to an oil sump (1). An orifice (13) is located after the cooler (11) in the line (14), in the direction of oil flow, the oil flow through the orifice (13) is controllable as a function of the speed of rotation of the drive motor of the vehicle and/or the speed of the vehicle.

11 Claims, 2 Drawing Sheets

HYDRAULIC SYSTEM

FIELD OF THE INVENTION

The present invention concerns a hydraulic system for a stepless transmission of a motor vehicle with a variator which possesses a first, drive side conical disk pair and a second power takeoff conical disk pair, between which an encircling member (e.g. an endless belt) runs, the first conical disk pair possesses one sliding, conical primary disk which can be controlled in an axial direction and the second power takeoff conical disk pair likewise possesses a sliding conical secondary disk which can be controlled in an axial movement and said primary and secondary disks are positioned by a hydraulic control apparatus, which apparatus has electromagnetic positioning members and hydraulic valves, the function of which apparatus is regulated by an electronic control system, and said apparatus has a cooler placed within a hydraulic oil lubricating/sump circulation for cooling the oil which leads from the cooler through a line to the sump.

BACKGROUND OF THE INVENTION

Stepless automatic drives of this type, conventionally known as the CVT (Continuously Variable Transmission), possess, along with the above, an initiating device in the form of a hydro-dynamic converter, a forward/reverse unit, an intermediate shaft, and a differential. These are generally powered by the engine of the motor vehicle through the drive shaft. The forward/reverse unit comprises, in most cases, a planetary gear assembly with at least one sun gear, several planet gears, a hollow shaft, a brake and a wet multi-plate clutch.

The variator is comprised of two conical disk pairs and one encircling member whereby each conical disk pair is composed of one first conical disk which is fixed in its axle position and a second conical disk which is displaceably slidable along its axle. The controllable sliding conical disk, placed on the drive side, is designated as the primary disk and the controllable sliding conical disk, placed on the power takeoff side, is designated as the secondary disk. The encircling member which runs between the two conical disk pairs is usually a steel thrust belt. By means of the displacement of the slidable disk along its axle, the effective diameter for the belt is changed, and thereby the speed ratio of the stepless transmission changes accordingly. Meanwhile, the second conical disk pair is nonrotatably affixed to a power take off shaft which transmits the torque to an intermediate shaft, which governs the direction of rotation and matches the rate of rotation and torque by means of a toothed gear pairing. The torque of the intermediate shaft is then transferred to the differential by means of a further toothed gear pairing.

Control of the stepless automatic transmission is carried out by the electronic control apparatus by means of the hydraulic equipment, wherein the electronic control apparatus includes electromagnetic positioning members as well as hydraulic valves. A pump supplies oil from the oil sump to the hydraulic control equipment and to lubrication points of the transmission.

EP A 634 590 discloses a hydraulic system for the separation of the primary and/or secondary conical disks by means of a hydraulic valve. As this is done, the first valve controls the primary disk, and the second valve regulates the secondary disk. Both the first and the second valves are servo-controlled by an electromagnetic pressure controller. A pump supplies the second valve with a pressure medium, while the pressure supply to the first valve is adjusted by a control means for the second valve. The pressure level of the supply line to the first valve is, in this operation, identical to the pressure level delivered by the pump.

DE A 195 33 976 proposes a hydraulic system for the control of a stepless automatic transmission, this system possessing a pump delivering to a central first hydraulic branch, which branch supplies, for example, the primary disk, the secondary disk, the hydrodynamic converter, the lubrication points as well as the clutch. A second hydraulic branch is connected to the first hydraulic branch by means of a pressure reducing valve and attends to a series of electromagnetic pressure controllers.

During operation, in order to cool the self-heated oil of a stepless automatic transmission of this kind, a cooling circuit is installed in many transmissions, in which the hydraulic system is provided with a cooler through which the oil passes. This is especially the case when the stepless transmission is provided with an intake throttled radial piston pump for its oil supply, wherewith its flow of fluid is limited to a specified value. In this case, the quantity of oil which passes through the cooler is essentially dependent upon the volume of flow of the entire transmission, and particularly dependent on the oil requirement of the variator upon positioning the primary and secondary conical disks as well as dependent upon the internal leakage of the control system.

In transmissions of this type, experience has shown that at full capacity operation, the available quantity of oil which passes through the cooler and is limited by fixed orifices is not sufficient to remove completely the evolving heat therein. Wherein the transmission capability of said clutch must be sufficient for usual driving maneuvering, in spite of the volume requirements for displacement of the primary and secondary disks of the variator, the oil flowing through the cooler is further limited giving consideration which need to be given to the cooling requirements of the outflow of oil from the converter clutch.

Thus, the purpose of the invention is to propose a hydraulic system which, even with an automatic stepless transmission of the type wherein provision has been made for an intake throttled radial piston pump, a sufficient cooling of the oil for the heat transfer needs of the converter clutch is assured.

SUMMARY OF THE INVENTION

The invention is based on a situation wherein, during full capacity operation and at high speed of the vehicle, the variator can be driven at a single point in said operation, at the so-called TOP-gear ratio. This means that, at this point, no high-dynamic change in the variator can be brought about. As far as volume flow balance, this has as a sequential effect such that more oil flows through the cooler.

The present invention provides that an orifice be placed in the cooling circuit, particularly in a line connecting the cooler with the sump. The flow through the orifice is a set function based on either the rotational rate of the drive motor of the vehicle and/or on the velocity. This function is represented by values between which the orifice is controllable from a set point at which it is nearly closed to a second setting at which it is open. With this arrangement, the overload of oil can be delivered to the cooler and then sent to the oil sump independently of the rate of rotation and/or the velocity of the vehicle.

The installation of the rotational rate dependent orifice in the lubrication/cooling circuit is carried out after the cooler, as seen in the direction of oil flow, whereby this orifice is located on the low pressure side of the pressure system which serves the variator. If the orifice is controlled by the rotation rate of the engine of the vehicle, then this rotation must be representative of the speed of the vehicle. Further, it is advantageous to formulate the orifice so that the outflow through the orifice only begins after a specified driving velocity is attained. After that point, the further adjustment of the orifice will be based on the quantity of oil passing through as a function of the rate of rotation. The provision of pressure for the variator can, in the conventional manner, be taken care of by the main pressure valve which regulates the system pressure.

When this is done, the variator is connected to the high pressure side and the lubrication/cooling circulation is on the low pressure side of the main pressure valve.

BRIEF DESCRIPTION OF THE DRAWINGS

In the following, the invention will be more closely described and explained with the help of the drawing.

DETAILED DESCRIPTION OF THE INVENTION

Figure 1:
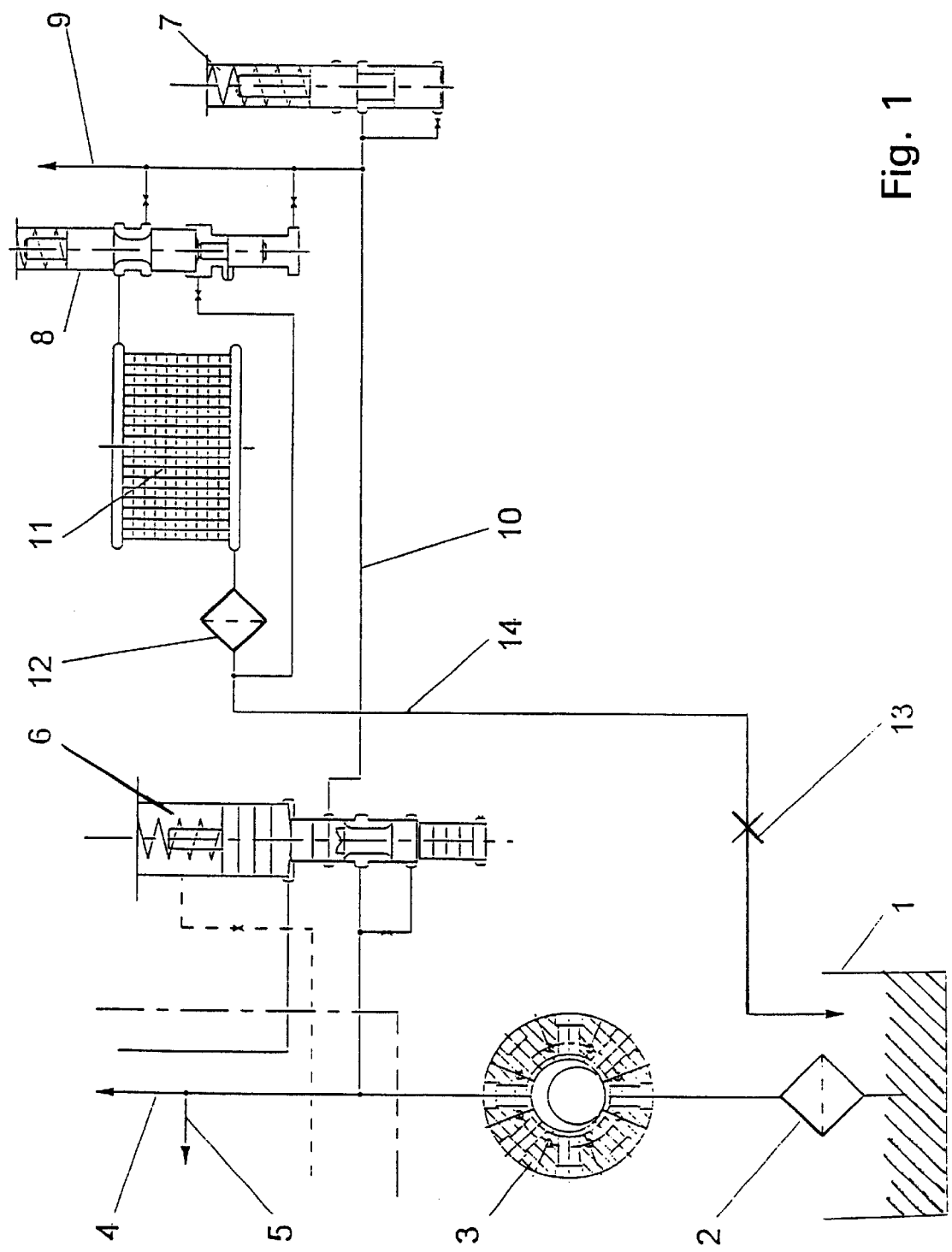
FIG. 1 shows that part of a hydraulic system necessary for an understanding of the invention.
Figure 2:
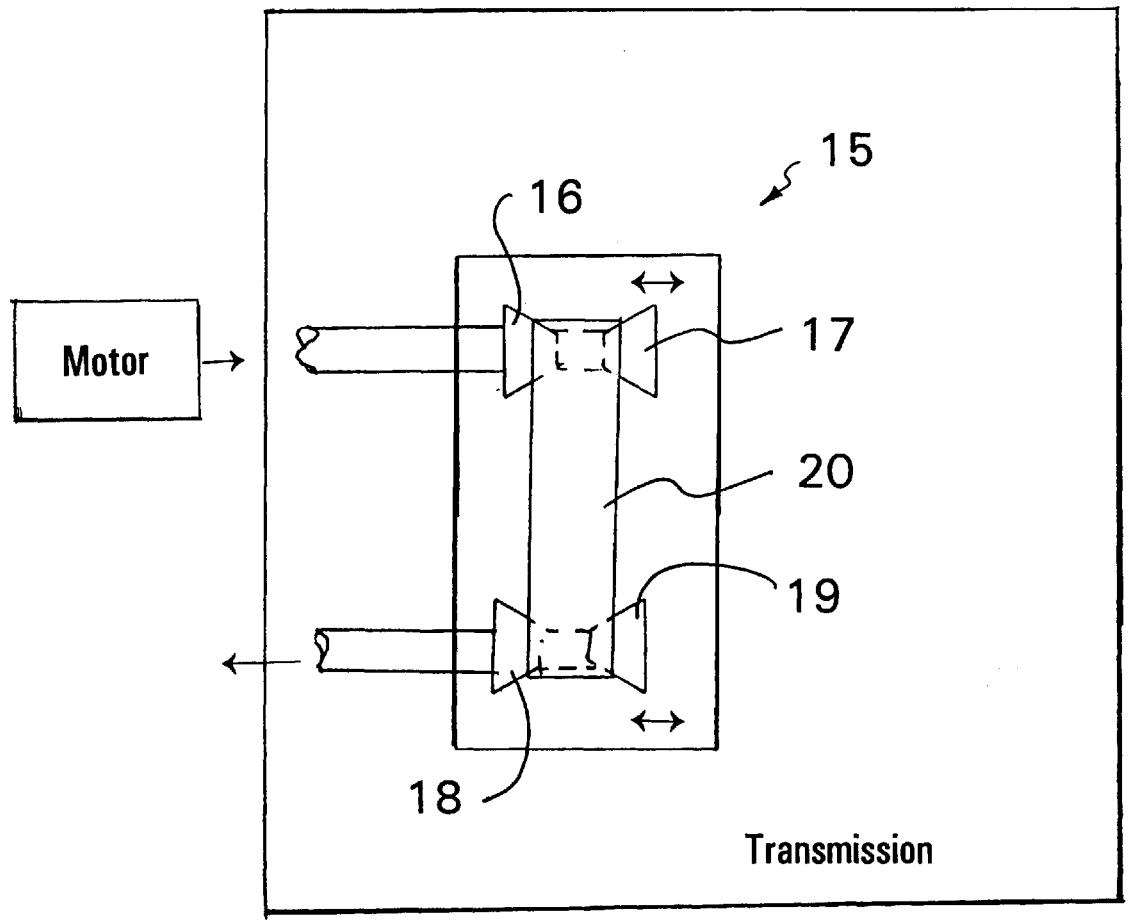
FIG. 2 diagrammatically shows a variator and its associated components.

A hydraulic system, for a stepless automatic transmission of a vehicle driven by a motor, is shown in FIG. 2 and the hydraulic system has a variator 15 which possesses a first, drive side conical disk pair 16, 17 and a second power takeoff conical disk pair 18, 19 and an endless belt 20 encircles both disk pairs 16, 17 and 18, 19 to supply driving power from the drive side conical disk pair 16, 17 to the power takeoff conical disk pair 18, 19. The first drive side conical disk pair 16, 17 possesses one conical sliding primary disk 17 which can be moved in an axial direction and the second power takeoff conical disk pair 18, 19 likewise possesses one conical sliding secondary disk 19 which can be moved in an axial direction. The primary and secondary disks 16, 17 and 18, 19 are regulated by a hydraulic control apparatus, discussed below. The system includes a cooler 11, in a lubrication/cooling circuit, and a line 14 leads from the cooler 11 to an oil sump 1.

Reference number 1 designates the oil sump from which a radial piston pump 3 removes oil, through a filter 2, by suction. The oil is then pumped through a line 4 to the control valves of the positioning chambers of the slidable conical disks. An additional line 5, which leads to apparatuses such as a pressure reducing valve, branches off from line 4. The number 6 depicts the main pressure valve of the hydraulic system which, via one connection, communicates with a converter safety valve 7 over line 10. Line 10 branches off into a line 9 for the supply of oil to the hydrodynamic converter to which a converter pressure valve (not shown) and a converter coupling valve (not shown) are assigned. A conventional lubrication valve 8 follows which is connected to a cooler 11 and a filter 12 is placed immediately thereafter. The invented controllable orifice 13 is placed in the line 14 between the filter and the sump 1.

If now capacities are loaded to the maximum and the highest level of vehicle speed has been attained, the variator is running at a single operational point, namely TOP-gear drive, then no further high-dynamic displacement of the variator can be achieved. Under these circumstances, the quantity of oil flowing to the cooler 11 is now increased so that, after a specified threshold vehicle speed has been reached, the orifice 13 permits flow into the oil sump 1. The orifice 13 is designed so that its cross-sectional open area is controllable between a first position, in which said orifice is closed, and a second position, in which the orifice is fully open, as a function of the speed of rotation of the drive motor of the vehicle and/or the vehicle speed.

Thus, the operation of this arrangement is such that the orifice starts to open upon reaching a predetermined vehicle speed and, above this predetermined vehicle speed, the orifice is then controlled in the direction of higher vehicle speed as a function of the increasing rate of rotation until the orifice reaches its fully open condition.

Reference Numbers
1 oil sump or reservoir
2 filter
3 radial piston pump
4 line from pump to pulley hydraulic operators
5 branch from 4 to, for instance, a pressure reducing valve
6 main pressure control valve of the hydraulic system
7 converter safety valve serving (not shown) converter
8 lubricating system valve
9 line, to the (not shown) converter
10 line connecting main pressure valve to the converter safety valve
11 oil cooler
12 filter following cooler
13 controllable orifice, i.e. opening movable
14 line from cooler to sump, containing filter and orifice
15 variator
16, 17 first drive side conical disk pair
18, 19 second power takeoff conical disk pair
20 endless belt

What is claimed is:

1. A hydraulic system for a stepless automatic transmission of a vehicle driven by a motor, the hydraulic system having a variator with a drive side first conical disk pair and a power takeoff second conical disk pair and an endless belt drivingly engaging the first and second conical disk pairs, the first conical disk pair having a sliding primary conical disk which is moveable in an axial direction and the second conical disk pair having a sliding secondary conical disk which is moveable in an axial direction and positions of the primary and secondary conical disks being regulated by a hydraulic control apparatus, the hydraulic control apparatus having electromagnetic positioning members and hydraulic valves which are regulated by an electronic control apparatus, the hydraulic system includes a lubrication/cooling circuit with a cooler (11) located therein, and a line (14) leading from the cooler (11) to an oil sump (1);

wherein an orifice (13) is inserted in the line (14) leading from the cooler (11) to the oil sump (1), and a cross-sectional flow opening of the orifice (13) is controllable between a first position, in which an opening of the orifice (13) is nearly closed, and a second position, in which the opening of the orifice (13) is substantially completely open, as a function of one of a rotational speed of the motor and a driving speed of the vehicle.

2. The hydraulic system according to claim 1, wherein the hydraulic control apparatus includes a main control valve (6) for establishing a system pressure, the variator is connected by supply lines (4, 5) to a high pressure side of the main control valve (6), the lubrication/cooling circuit is connected by a line (10) to a low pressure side of the main control valve (6), and the orifice (13) is positioned on the low pressure side of the main control valve (6) between the cooler (11) and the oil sump (1).

3. The hydraulic system according to claim 2, wherein the cross-sectional flow opening of the orifice (13) only begins to open once a specified vehicle speed is reached by the vehicle.

4. The hydraulic system according to claim 2, wherein the cross-sectional flow area of the orifice is controllable, between the first position and the second position, by a control device.

5. The hydraulic system according to claim 1, wherein the cross-sectional flow opening of the orifice (13) only begins to open once a specified vehicle speed is reached by the vehicle.

6. The hydraulic system according to claim 1 wherein a filter (12) is located in the line (14) leading from the cooler (11) to the oil sump (1) and the filter (12) is located between the cooler (11) and the orifice (13).

7. A hydraulic system for a stepless automatic transmission of a vehicle driven by a motor, the hydraulic system having a variator with a drive side first conical disk pair and a power takeoff second conical disk pair and an endless belt drivingly engaging the first and second conical disk pairs, the first conical disk pair having a sliding primary conical disk which is moveable in an axial direction and the second conical disk pair having a sliding secondary conical disk which is moveable in an axial direction and positions of the primary and secondary conical disks being regulated by a hydraulic control apparatus, the hydraulic control apparatus having electromagnetic positioning members and hydraulic valves which are regulated by an electronic control apparatus, the hydraulic system includes a lubrication/cooling circuit with a cooler (11) located therein, and a line (14) leading from the cooler (11) to an oil sump (1);

wherein an orifice (13) is inserted in the line (14) leading to the oil sump (1), and a cross-sectional flow opening of the orifice (13) is controllable as a function of one of a rotational speed of the motor and a driving speed of the vehicle, between a first low oil flow position and a second relatively higher oil flow position.

8. A method of controlling a hydraulic system for a stepless automatic transmission of a motor vehicle driven by a motor, the hydraulic system having a variator with a drive side first conical disk pair and a power takeoff second conical disk pair and an endless belt drivingly engaging the first and second conical disk pairs, the first conical disk pair having a sliding primary conical disk which is moveable in an axial direction and the second conical disk pair having a sliding secondary conical disk which is moveable in an axial direction and positions of the primary and secondary conical disks being regulated by a hydraulic control apparatus, the hydraulic control apparatus having electromagnetic positioning members and hydraulic valves which are regulated by an electronic control apparatus, the hydraulic system includes a lubrication/cooling circuit with a cooler (11) located therein, and a line (14) leading from the cooler (11) to an oil sump (1); the method comprising the steps of:

positioning an orifice (13) in the line (14) leading from the cooler (11) to the oil sump (1);

detecting at least one of a rotational speed of the motor and a driving speed of the vehicle incorporating the hydraulic system; and changing, upon detecting a predetermined value of one of the rotational speed of the motor and the driving speed of the vehicle, a cross-sectional flow opening of the orifice positioned in the line (14) leading from the cooler (11) to an oil sump (1).

9. The method according to claim 16, further comprising the step of changing the cross-sectional flow area of the orifice to a second substantially opened position at a top speed of the vehicle.

10. The method according to claim 8, further comprising the step of changing the cross-sectional flow area of the orifice toward a first substantially closed position at a speed substantially lower than the top speed of the vehicle.

11. The method according to claim 8, further comprising the step of locating a filter (12) in the line (14) leading from the cooler (11) to the oil sump (1) between the cooler (11) and the orifice (13).

* * * * *